Patented Feb. 15, 1949

2,461,852

UNITED STATES PATENT OFFICE 2,461,852

STABILIZATION OF DDT

Gustav A. Stein, Plainfield, and Max Tishler, Rahway, N. J., assignors to Merck & Co., Inc., Rahway, N. J., a corporation of New Jersey No Drawing. Application February 22, 1945, Serial No. 579,308

11 Claims. (Cl. 260—649)

This invention relates to a method of stabilizing the insecticide dichlordiphenyl-trichlorethane (hereafter referred to as DDT) and to the stabilized product thus obtained.

After standing for long periods of time exposed to light or upon heating, DDT decomposes with formation of hydrochloric acid and the decomposition products appear to catalyze further decomposition. It has also been observed that the decomposition is accelerated by certain contaminants, especially iron and other metals or metallic compounds which as a result of commercial operations are often present as impurities in commercially prepared DDT. Ferric chloride formed by reaction of the iron with the hydrochloric acid is a particularly active decomposition catalyst.

It is discovered pursuant to the present invention that DDT can be stabilized by treatment with small amounts of neutral or weakly basic compounds capable of reacting with acids or acidic substances. Satisfactory agents for this purpose include calcium carbonate, disodium phosphate, sodium carbonate, calcium acetate, barium acetate, calcium lactate, basic lead acetate, bismuth subcarbonate, aluminum phosphate, lead carbonate, ammonia, ammonium carbonate and lower alkyl amines.

In accordance with the present invention, the selected agent is incorporated in the DDT by heating the latter to cause fusion and then forming a homogeneous mixture with the agent, the mixture being effected under conditions such that a small amount of moisture is present. For example the agent can be added in solution and the temperature at which the mixing is done can be maintained at a level such that rapid steam formation is attained, thus assisting in distributing the agent throughout the melt. The presence of small amounts of water, for instance of the order of one percent based on weight, is important for satisfactory results. When ammonia is used, a mixture of steam and ammonia gas may be blown through the molten DDT to effect production of a stabilized product. The amount of agent to be used varies somewhat depending on the purity of the DDT and the particular agent used. To ascertain the quantity of agent to be employed, the acidity of the DDT is determined and a sufficient quantity of the agent is mixed therewith to cause the mixture to be neutral or slightly alkaline. In general it is necessary to add the agent in amounts less than 0.5% by weight of DDT and usually amounts of the order of .05% by weight are satisfactory.

The following examples illustrate methods of carrying out the present invention, but it is to be understood that these examples are given by way of illustration and not of limitation.

Examples 1, 2, and 3 illustrate the method of making the stabilized DDT.

Example 1

A factory batch of DDT having a pH 6.87 was divided into two parts, one portion serving as a control and the other portion being treated according to the invention. To stabilize the second portion it was heated to 105°, stirred with a slurry of 250 mgm. of calcium carbonate in 4.5 cc. of water per pound of DDT, heated for 5 minutes to drive off the water, and filtered. To the filtrate was added an additional 250 mgm. of calcium carbonate in 4.5 cc. of water per pound of DDT and the mixture was heated and stirred at 105° C. for 5 min. Aliquot parts of both the control and treated samples were heated at 115° for 4 hours and tested for acidity. The pH of the control was 3.3 and the pH of the treated portion was 6.96.

Example 2

A factory batch of DDT having a pH of 6.5 was divided into two parts, one portion serving as a control and the other portion being stabilized according to the instant invention. To stabilize the second portion it was heated to 105° and mixed by mechanical stirring with 4.5 cc. of a 10% sodium phosphate solution per pound of DDT. The sodium phosphate solution was prepared by neutralizing trisodium phosphate to a pH of about 7.0 with phosphoric acid. The above mixture was heated for 5 minutes to drive off the water and filtered. To the filtrate was added an additional 4.5 cc. of the sodium phosphate solution per pound of DDT and the mixture was heated and stirred at 105° C. for 5 minutes. Aliquot parts of both the control and treated samples were heated at 115° for 5 hours and tested for acidity. The pH of the control was 3.3 and the pH of the stabilized portion was 6.96.

Example 3

A factory batch of DDT having a pH of 6.74 was divided into two portions, one portion serving as a control and the other portion being stabilized according to the present invention. To stabilize the second portion it was heated to 105°, stirred with a slurry of 250 mgm. of sodium carbonate in 4.5 cc. of water per pound of DDT, heated for 5 minutes to drive off the water and filtered. To the filtrate was added an additional 250 mgm. of sodium carbonate in 4.5 cc. of water per pound of DDT and the mixture was heated and stirred at 105° C. for 5 minutes. Aliquot parts of both the control and treated portions were heated at 115° for 6 hours and tested for acidity. The pH of the control was 3.7 and the pH of the treated portion was 7.2.

Example 4 below illustrates the enhanced stability of a neutralized and stabilized DDT composition as compared with pure DDT, a factory or commercial batch, and a factory batch that has been merely neutralized.

Example 4

A typical factory batch of DDT was divided into three parts. One part was reserved as a test or control sample; a second part was melted, neutralized with calcium carbonate and filtered; and third part was treated in the same manner as the second except that 0.02% of calcium carbonate was added to the filtrate. These three samples together with a sample of purified but unstabilized DDT were then heated at 115° and tested periodically for stability. The results of these tests appear in the following table:

| Hrs. at 115° | Pure DDT | Factory Batch | | |
|---|---|---|---|---|
| | | Control Sample | Second Part | Third Part |
| 0 | | 6.02 | 6.56 | 6.60 | 6.60 |
| ½ | | | 4.12 | 6.13 | |
| 1 | 7.75 | 3.70 | 4.93 | 6.06 |
| 2 | | | 3.38 | 6.21 |
| 3 | 4.59 | | | 6.38 |
| 4 | 4.43 | | | 6.48 |
| 5 | 3.52 | | | 6.11 |
| 6 | | | | 6.28 |
| 31 | | | | 6.32 |
| 95 | | | | 5.98 |

Modifications may be made in carrying out the present invention without departing from the spirit and scope thereof and the invention is to be limited only by the appended claims.

What is claimed is:

1. The process of stabilizing DDT which comprises heating an aqueous mixture containing molten $\alpha,\alpha$-di(p-chlorophenyl)-$\beta,\beta,\beta$-trichloroethane and less than about 0.5%, based on the weight of the DDT, of a weakly basic compound at a temperature of approximately 105° C., thereby evaporating the water and forming a substantially homogeneous liquid mixture of the other components, and cooling to solidify said mixture.

2. The process of stabilizing DDT which comprises melting $\alpha,\alpha$-di(p-chlorophenyl)-$\beta,\beta,\beta$-trichloroethane and adding thereto, while still in the molten state, an aqueous slurry of calcium carbonate, evaporating the water by heating the resulting mixture at a temperature of approximately 105° C., filtering the substantially anhydrous molten product, then adding to the resulting filtrate, while still in the molten state, an additional quantity of the aqueous slurry of calcium carbonate, the total weight of calcium carbonate in both additions being less than about 0.5% of the weight of the DDT, and again evaporating the water by heating the mixture at a temperature of approximately 105° C., thereby forming a substantially homogeneous mixture containing $\alpha,\alpha$-di(p-chlorophenyl)-$\beta,\beta,\beta$-trichloroethane and less than about 0.5%, based on the weight of the DDT, of calcium carbonate.

3. The process of stabilizing DDT which comprises melting $\alpha,\alpha$-di(p-chlorophenyl)-$\beta,\beta,\beta$-trichloroethane and adding thereto, while still in the molten state, an aqueous solution of disodium phosphate, evaporating the water by heating the resulting mixture at a temperature of approximately 105° C., filtering the substantially anhydrous molten product, then adding to the resulting filtrate, while still in the molten state, an additional quantity of an aqueous solution of disodium phosphate, the total weight of sodium phosphate in both additions being less than about 0.5% of the weight of the DDT, and again evaporating the water by heating the mixture at a temperature of approximately 105° C., thereby forming a substantially homogeneous mixture containing $\alpha,\alpha$-di(p-chlorophenyl)-$\beta,\beta,\beta$-trichloroethane and less than about 0.5%, based on the weight of the DDT, disodium phosphate.

4. The process of stabilizing DDT which comprises heating an aqueous mixture containing molten $\alpha,\alpha$-di(p-chlorophenyl)-$\beta,\beta,\beta$-trichloroethane and less than about 0.5%, based on the weight of the DDT, of calcium carbonate at a temperature of approximately 105° C., thereby evaporating the water and forming a substantially homogeneous liquid mixture of the other components, and cooling to solidify said mixture.

5. The process of stabilizing DDT which comprises heating an aqueous mixture containing molten $\alpha,\alpha$-di(p-chlorophenyl)-$\beta,\beta,\beta$-trichloroethane and less than about 0.5%, based on the weight of the DDT, of disodium phosphate at a temperature of approximately 105° C., thereby evaporating the water and forming a substantially homogeneous liquid mixture of the other components, and cooling to solidify said mixture.

6. The process of stabilizing DDT which comprises heating an aqueous mixture containing molten $\alpha,\alpha$-di(p-chlorophenyl)-$\beta,\beta,\beta$-trichloroethane and less than about 0.5%, based on the weight of the DDT, of sodium carbonate at a temperature of approximately 105° C., thereby evaporating the water and forming a substantially homogeneous liquid mixture of the other components, and cooling to solidify said mixture.

7. A stabilized homogeneous DDT composition, containing less than about 0.5%, based on the weight of the DDT, of a weakly basic stabilizing agent, said composition being prepared by heating an aqueous mixture containing molten $\alpha,\alpha$-di(p-chlorophenyl)-$\beta,\beta,\beta$-trichloroethane and less than about 0.5%, based on the weight of the DDT, of a weakly basic compound at a temperature of approximately 105° C., thereby evaporating the water and forming a substantially homogeneous liquid mixture of the other components, and cooling to solidify said mixture.

8. A stabilized homogeneous DDT composition containing less than about 0.5%, based on the weight of the DDT, of calcium carbonate, said composition being prepared by heating an aqueous mixture containing molten $\alpha,\alpha$-di(p-chlorophenyl)-$\beta,\beta,\beta$-trichloroethane and less than about 0.5%, based on the weight of the DDT, of calcium carbonate at a temperature of approximately 105° C., thereby evaporating the water and forming a substantially homogeneous liquid mixture of the other components, and cooling to solidify said mixture.

9. A stabilized homogeneous DDT composition containing less than about 0.5%, based on the weight of the DDT, of disodium phosphate, said composition being prepared by heating an aqueous mixture containing molten $\alpha,\alpha$-di(p-chlorophenyl)-$\beta,\beta,\beta$-trichloroethane and less than about 0.5%, based on the weight of the DDT, of disodium phosphate at a temperature of approximately 105° C., thereby evaporating the water and forming a substantially homogeneous liquid mixture of the other components, and cooling to solidify said mixture.

10. A stabilized homogeneous DDT composition containing less than about 0.5%, based on the weight of the DDT, of sodium carbonate, said composition being prepared by heating an aqueous mixture containing molten $\alpha,\alpha$-di-(p-chlorophenyl)-$\beta,\beta,\beta$-trichloroethane and less than about 0.5%, based on the weight of the DDT, of sodium carbonate at a temperature of approximately 105° C., thereby evaporating the water and forming a substantially homogeneous liquid mixture of the other components, and cooling to solidify said mixture.

11. The process of stabilizing DDT which comprises melting $\alpha,\alpha$-di(p-chlorophenyl)-$\beta,\beta,\beta$-trichloroethane and adding thereto, while still in the molten state, an aqueous solution of sodium carbonate, evaporating the water by heating the resulting mixture at a temperature of approximately 105° C., filtering the substantially anhydrous molten product, then adding to the resulting filtrate, while still in the molten state, an additional quantity of an aqueous solution of sodium carbonate, the total weight of sodium carbonate in both additions being less than about 0.5% of the weight of the DDT, and again evaporating the water by heating the mixture at a temperature of approximately 105° C., thereby forming a substantially homogeneous mixture containing $\alpha,\alpha$-di(p-chlorophenyl)-$\beta,\beta,\beta$-trichloroethane and less than about 0.5%, based on the weight of the DDT, of sodium carbonate.

GUSTAV A. STEIN.
MAX TISHLER.

REFERENCES CITED

The following references are of record in the file of this patent:

UNITED STATES PATENTS

| Number | Name | Date |
|---|---|---|
| 2,036,274 | Holler | Apr. 7, 1936 |
| 2,076,430 | Hanson et al. | Apr. 6, 1937 |
| 2,259,978 | McLean | Oct. 21, 1941 |

FOREIGN PATENTS

| Number | Country | Date |
|---|---|---|
| 391,156 | Great Britain | Apr. 18, 1933 |
| 547,874 | Great Britain | Sept. 15, 1942 |
| 711,858 | France | Dec. 27, 1937 |